US 6,701,083 B2

(12) United States Patent
Manabe

(10) Patent No.: US 6,701,083 B2
(45) Date of Patent: Mar. 2, 2004

(54) CAMERA WITH SAFETY-LOCK MECHANISM

(75) Inventor: Mitsuo Manabe, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 32 days.

(21) Appl. No.: 10/109,897

(22) Filed: Apr. 1, 2002

(65) Prior Publication Data

US 2002/0141755 A1 Oct. 3, 2002

(30) Foreign Application Priority Data

Mar. 30, 2001 (JP) ....................................... 2001-099296

(51) Int. Cl.⁷ .............................................. G03B 17/02
(52) U.S. Cl. ....................................... 396/536; 396/538
(58) Field of Search ................................ 396/514, 516, 396/536, 538, 543

(56) References Cited

U.S. PATENT DOCUMENTS

| 5,481,325 | A | | 1/1996 | Wada et al. ................. 396/538 |
| 5,646,711 | A | | 7/1997 | Kitazawa et al. ........... 396/413 |
| 5,752,118 | A | | 5/1998 | Lai ............................. 396/513 |
| 5,893,000 | A | * | 4/1999 | Iwai et al. .................. 396/514 |
| 5,933,672 | A | | 8/1999 | Huang ........................ 396/536 |
| 6,295,421 | B1 | * | 9/2001 | Matsumoto ................. 396/536 |
| 6,371,666 | B1 | | 4/2002 | Manabe et al. ............. 396/411 |

FOREIGN PATENT DOCUMENTS

| JP | 2-21634 | 2/1990 |
| JP | 5-232560 | 9/1993 |
| JP | 7-199305 | 8/1995 |
| JP | 8-62685 | 3/1996 |
| JP | 10-31243 | 2/1998 |
| JP | 10-039366 | 2/1998 |
| JP | 11-24159 | 1/1999 |

* cited by examiner

*Primary Examiner*—Christopher Mahoney
(74) *Attorney, Agent, or Firm*—Young & Thompson

(57) ABSTRACT

A safety-lock mechanism for a camera includes a lock member that is rotatable between first and second lock positions for locking a lid open-close mechanism in a latching position where a lid of a cartridge chamber of the camera is latched closed; and an unlock position for allowing the lid open-close mechanism to unlatch the lid of the cartridge chamber. The lock member cooperates with a film transport mechanism such that the lock member moves from the unlock position to the first lock position as the film transport mechanism starts winding the photo filmstrip, and moves from the first lock position to the second lock position as the film transport mechanism starts rewinding the photo filmstrip. The lock member is urged by a spring to move to the unlock position.

9 Claims, 13 Drawing Sheets

WINDING LOCK POSITION

REWINDING LOCK POSITION

UNLOCK POSITION

CAMERA WITH SAFETY-LOCK MECHANISM

BACKGROUND OF THE INVENTION

1. Field of the Invention

The present invention relates to a camera with a safety-lock mechanism that locks a lid of a cartridge chamber in a closed position so long as a photo filmstrip is located outside a film cartridge as loaded in the cartridge chamber.

2. Background Arts

A camera with a safety-lock mechanism has been suggested in Japanese Patent Application No. 11-280317 (corresponding to U.S. patent application Ser. No. 09/671,798 filed on Sep. 28, 2000), wherein the safety-lock mechanism comprises a winding lock member for locking the lid of the cartridge chamber in the closed position while the filmstrip is wound up onto a take-up spool, and a rewinding lock member for locking the lid of the cartridge chamber in the closed position while the filmstrip is rewound into a cartridge shell.

These two lock members are driven by a feed motor that also drives a spool of the cartridge shell and the take-up spool. The winding lock member moves to its lock position as the feed motor rotates in a forward direction to drive the take-up spool to wind up the filmstrip. The winding lock member moves to its unlock position as the feed motor rotates in a reverse direction to drive the spool of the cartridge shell to rewind the filmstrip. On the contrary, the rewinding lock member moves to its lock position as the feed motor rotates in the reverse direction to rewind the filmstrip, and moves to its unlock position as the feed motor rotates in the forward direction to wind up the filmstrip onto the take-up spool. In this way, the lid of the cartridge chamber is prevented from opening during the film winding and the film rewinding as well.

However, because of the two lock members, this safety-lock mechanism is complicated.

SUMMARY OF THE INVENTION

In view of the foregoing, an object of the present invention is to provide a camera with a simple and stable safety-lock mechanism.

A camera according to the present invention comprises: a lid open-close mechanism that moves to a latching position to latch a lid of a cartridge chamber when the lid is closed, and moves to an unlatching position to unlatch the lid in response to an opening operation thereon; a film transport mechanism driven by a feed motor to wind a photo filmstrip of a photo film cartridge as loaded in the cartridge chamber around a take-up spool and rewind the photo filmstrip into a cartridge shell; and a safety-lock mechanism comprising a lock member that is movable between first and second lock positions for locking the lid open-close mechanism in the latching position, and an unlock position for allowing the lid open-close mechanism to unlatch the lid of the cartridge chamber, wherein the lock member moves from the unlock position to the first lock position as the film transport mechanism starts winding the photo filmstrip, and moves from the first lock position to the second lock position as the film transport mechanism starts rewinding the photo filmstrip.

Since the single lock member has the first and second lock positions for locking the lid open-close mechanism in the latching position after the photo filmstrip starts being wound around the take-up spool, as well as while the filmstrip is being rewound into the cartridge shell, the safety-lock mechanism of the camera of the present invention is very simple in construction.

It is preferable to locate the unlock position of the lock member between the first lock position and the second lock position, and urges the lock member by a spring to move from the first lock position or the second lock position to the unlock position. Thereby, the lock member rapidly returns to the unlock position when it is required.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
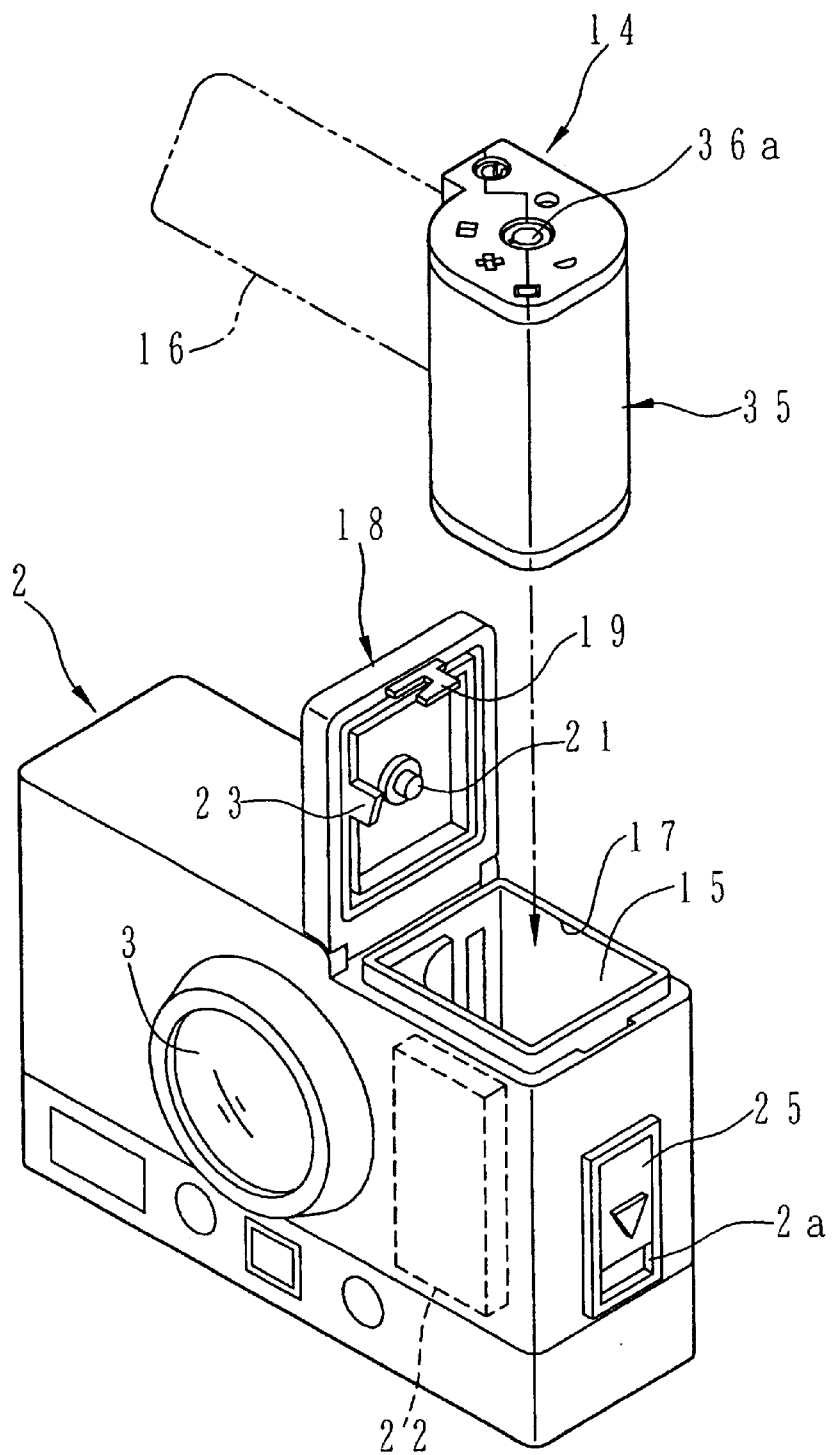
FIG. 1 shows a bottom perspective view of a camera in a position to load a film cartridge, according to an embodiment of the present invention.
Figure 2:
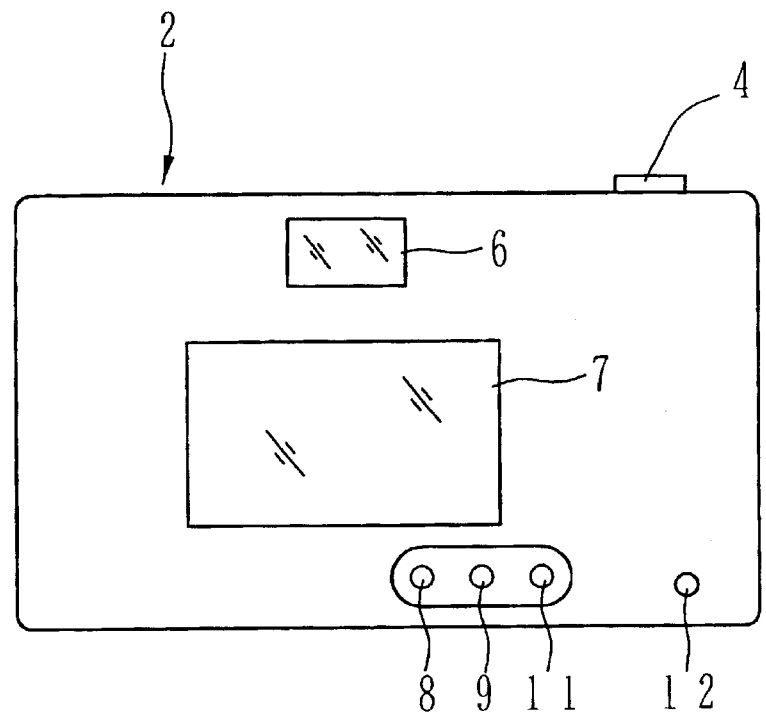
FIG. 2 shows a rear view of the camera of FIG. 1.

In a camera 2 shown in FIGS. 1 and 2, a taking lens 3 and a shutter button 4 are mounted in the front center and the top of the camera 2, respectively. On the rear of the camera 2 are located a finder eyepiece window 6, an LCD panel 7, operation switches 8, 9 and 11, and a rewinding switch 12. The LCD panel 7 is of a dot-matrix type, and displays various information as set forth in detail later. The rewinding switch 12 permits rewinding a photo filmstrip into a film cartridge 14 even before the completion of all available exposures.

Inside the camera 2, on opposite sides of the taking lens 3, there are provided a cartridge chamber 15 and a not-shown film chamber. A photo filmstrip 16 is withdrawn from the film cartridge 14 and wound up into the film chamber. The cartridge chamber 15 has a rectangular open bottom 17 that is closed with a lid 18. The lid 18 is hinged to one side of the rim of the open bottom 17, and is opened when loading or unloading the cartridge chamber 15.

The lid 18 is locked in the closed position through engagement between a hook and a lid open-close mechanism as set forth in detail below. A pressure boss 21 for pressing the photo film cartridge 14 into the cartridge chamber 15 and a pressure lug 23 for pressing an eject mechanism 22 into the cartridge chamber 15 are formed on the inside of the lid 18. As the lid 18 is opened, the eject mechanism 22 pushes the photo film cartridge 14 out of the cartridge chamber 15, thereby making it ease to take out the photo film cartridge 14 from the cartridge chamber 15.

A slider 25, a member of the lid open-close mechanism, is mounted on the side wall of the camera 2 adjacent the cartridge chamber 15. The slider 25 can slide up and down along a slit 2a. While the lid 18 is locked, the slider 25 is in a lower end position as viewed in the upright posture of the camera 2. The lid open-close mechanism is configured such that the lid 18 is opened by sliding the slider 25 upward.

Figure 3:
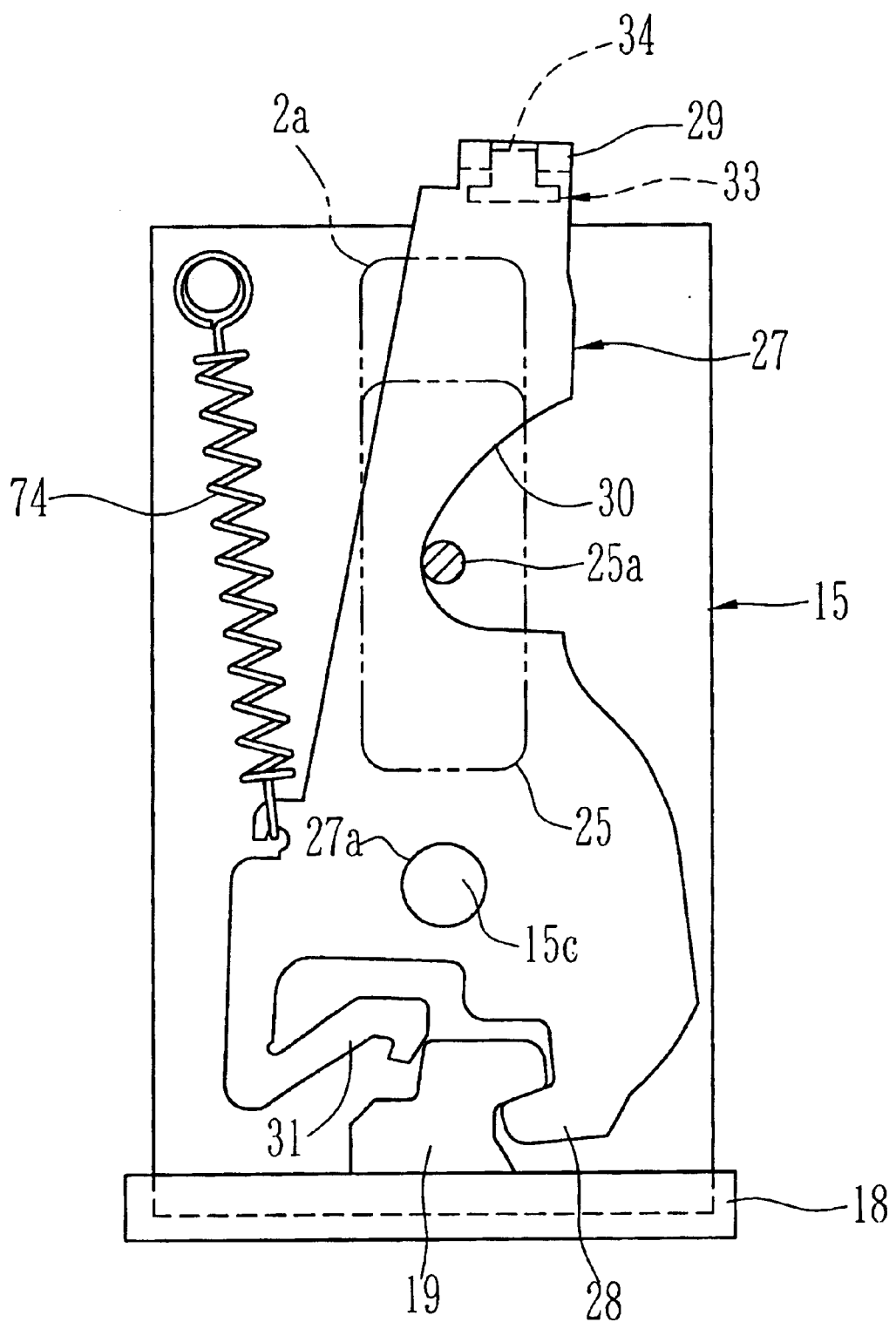
FIG. 3 shows a lid open-close mechanism in its latching position where a lid of a cartridge chamber is latched in its closed position.
Figure 4:
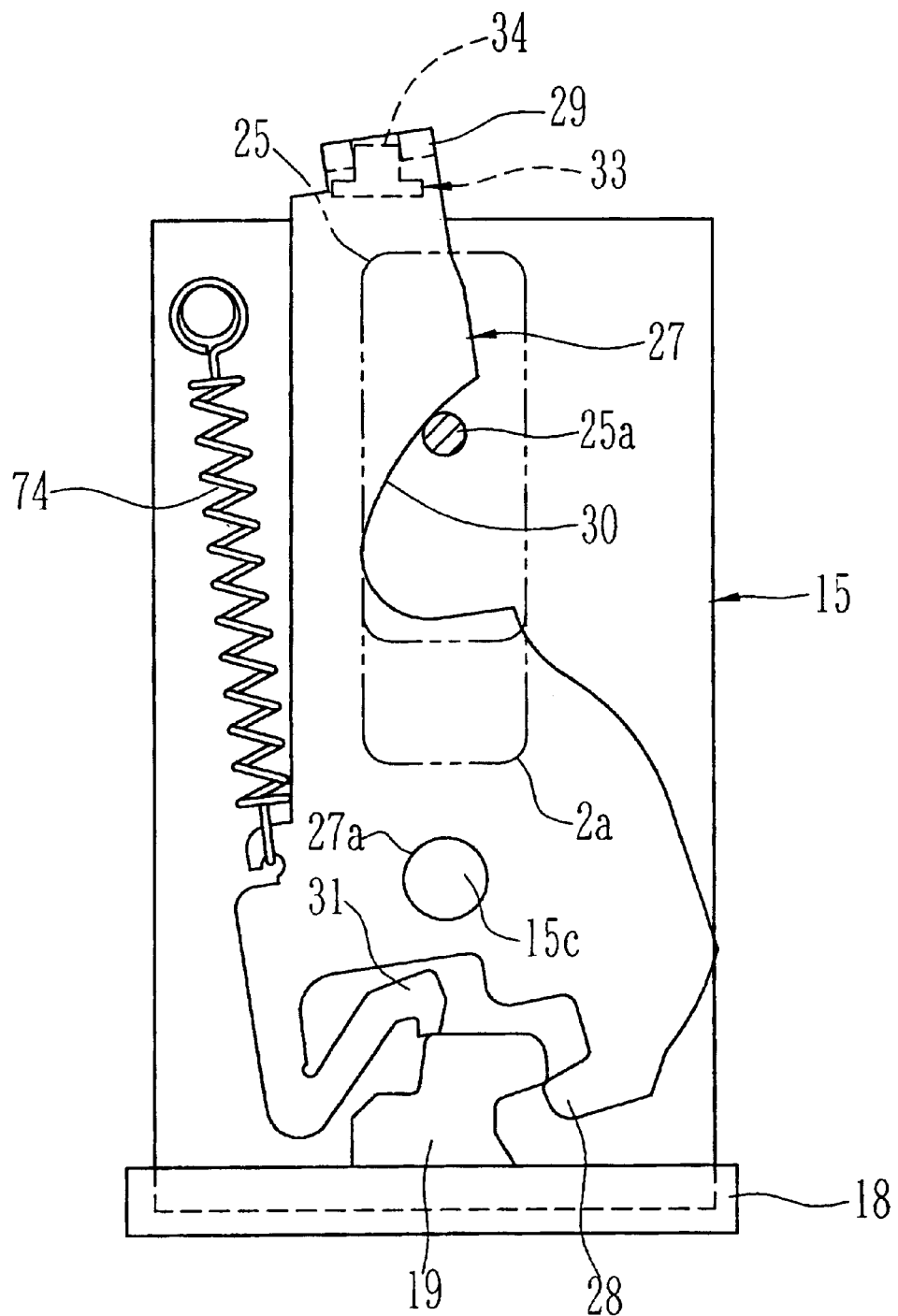
FIG. 4 shows the lid open-close mechanism in its unlatching position.

As shown in FIG. 3, a latch lever 27 is mounted inside the cartridge chamber 15 in opposition to the slider 25. A pivot hole 27a of the latch lever 27 is fitted on a pin 15c that is formed on the inside of the cartridge chamber 15, so the latch lever 27 may swing about the pin 15c between a latching position where an engaging arm 28 formed on one end of the latch lever 27 is engaged with the hook 19 of the lid 18, as shown in FIG. 3, and an unlatching position where the engaging arm 28 is disengaged from the hook 19, as shown in FIG. 4. A coiled spring 74 urges the latch lever 27 to swing toward the latching position.

The slider 25 has a pin 25a formed integrally on its rear side, and the pin 25a is coupled to a cam notch 30 of the latch lever 27. In the latching position of the latch lever 27, because of the urging force of the coiled spring 74, the pin 25a is pushed downward by the cam notch 30, so the slider 25 is kept in the lower end of the slit 2a. As the slider 25 is slid up, the pin 25a slides up pushing the cam notch 30 upward, causing the latch lever 27 to swing to the unlatching position against the force of the coiled spring 74, thereby to disengage the engaging arm 28 of the latch lever 27 from the hook 19 of the lid 18. A resilient arm 31 is provided on another end of the latch lever 27, on the same side as the engaging arm 28 from the pivot hole 27a. The resilient arm 31 is pressed against the hook 19 in the latching position, so that the lid 18 is pushed open slightly by the rebound of the resilient arm 31 when the engaging arm 28 is disengaged from the hook 19.

An opposite end of the latch lever 27 from the engaging arm 28 is shaped into a fork 29, and is interlocked with a connection pin 34 of an interconnection lever 33. The interconnection lever 33 is a member for interconnecting the latch lever 27 with a cartridge door open-close mechanism and a safety-lock mechanism, which will be described in detail later.

Figure 5:
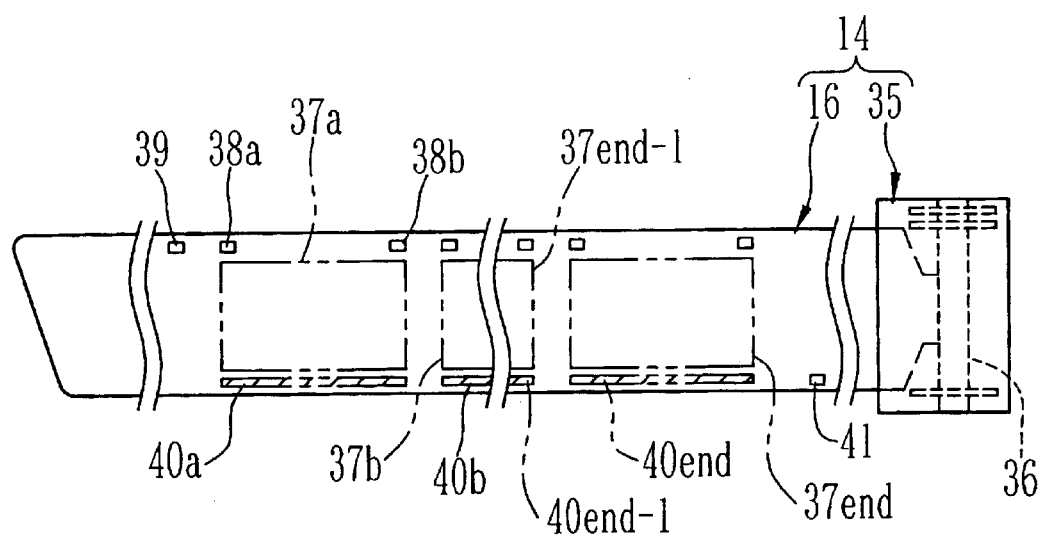
FIG. 5 shows a schematic diagram of a photo film cartridge of IX240 type.

As shown in FIG. 5, the film cartridge 14 has a spool 36 that may rotate inside a cartridge shell 35 in opposite directions. Since the photo filmstrip 16 is fastened at its trailing end to the spool 36, the photo filmstrip 16 is wound around the spool 36 by rotating the spool 36 in one direction, hereinafter called a rewinding direction. By virtue of a film advancing mechanism that is not-shown but provided inside the cartridge shell 35, the photo filmstrip 16 is advanced out of the cartridge shell 35 by rotating the spool 36 in the other direction, hereinafter called a film advancing direction. Both end faces of the spool 36 are exposed from opposite end faces of the cartridge shell 35.

The photo filmstrip 16 has a plurality of frame exposure areas 37a, 37b . . . 37end, and leading and trailing edges of each frame exposure area are respectively indicated by perforations 38a and 38b which are formed along a marginal side of the photo filmstrip 16. A perforation 39 is formed on the same marginal side as the perforations 38a and 38b in a leading end of the photo filmstrip 16 ahead of the first frame exposure area 37a. The perforation 39 is used for automatically positioning the first frame exposure area 37a in an exposure position behind the taking lens 3 after the film cartridge 14 is loaded in the camera 2. In addition, a perforation 41 is formed behind the last frame exposure area 37end, for use in detecting the trailing end of the photo filmstrip 16 mechanically or optically.

The photo filmstrip 16 has a photosensitive layer on an obverse side of a base material, and a transparent magnetic recording layer on a rear side of the base material. Magnetic recording tracks 40a, 40b . . . 40end are provided along another marginal side of the cartridge chamber 15 in correspondence with the respective frame exposure areas 37a to 37end. As described later, exposure control data, print order data, frame title data and other data are magnetically recorded on these magnetic recording tracks 40a to 40end.

Figure 6A:
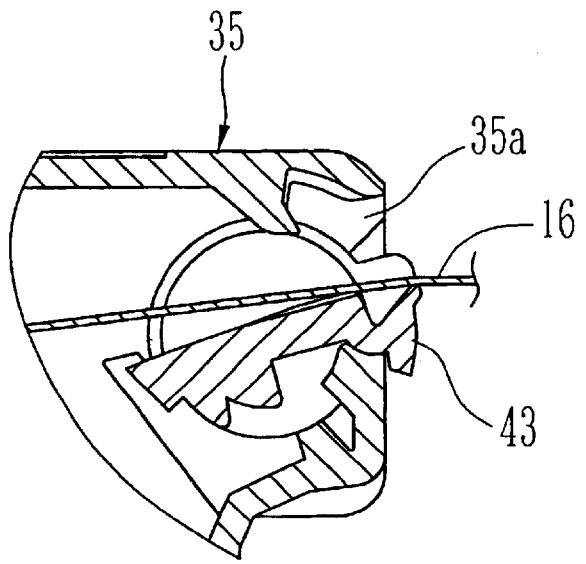
FIG. 6A shows a fragmentary section of the photo film cartridge, illustrating an open position of a door member disposed in a film port of a cartridge shell.
Figure 6B:
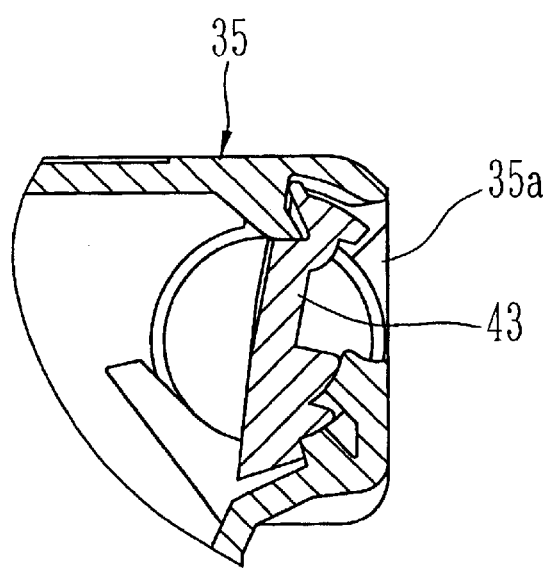
FIG. 6B shows a fragmentary section of the photo film cartridge, illustrating a closed position of the door member.
Figure 7A:
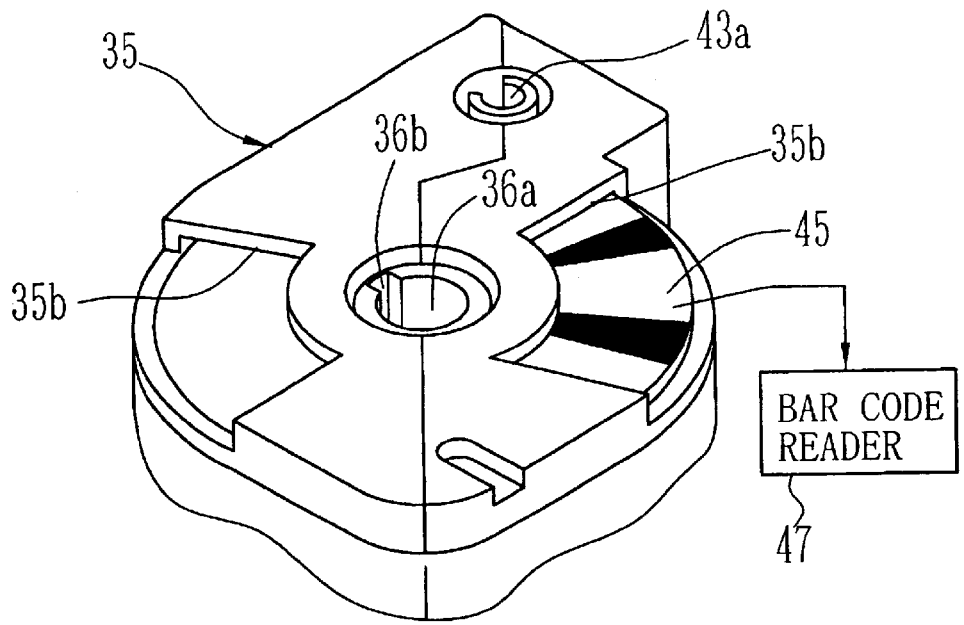
FIG. 7A shows a fragmentary perspective view of the photo film cartridge as viewed from one end with a data disc.
Figure 7B:
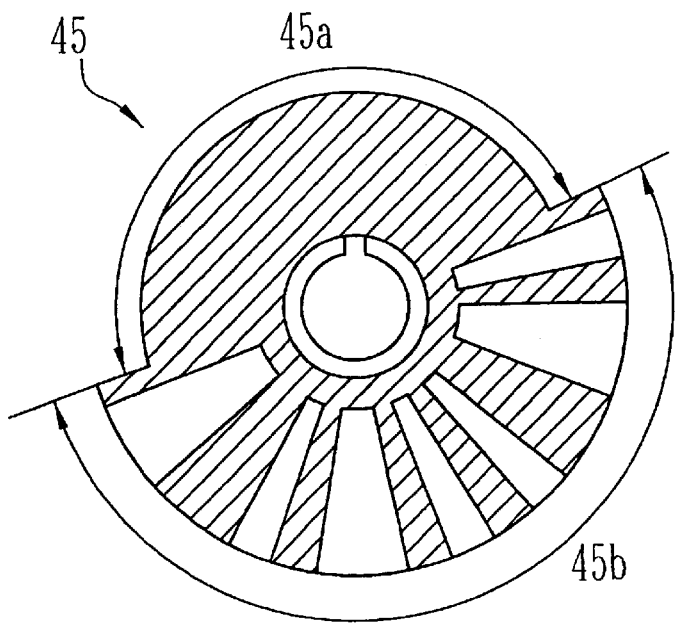
FIG. 7B shows a top plan view of the data disc.
Figure 8:
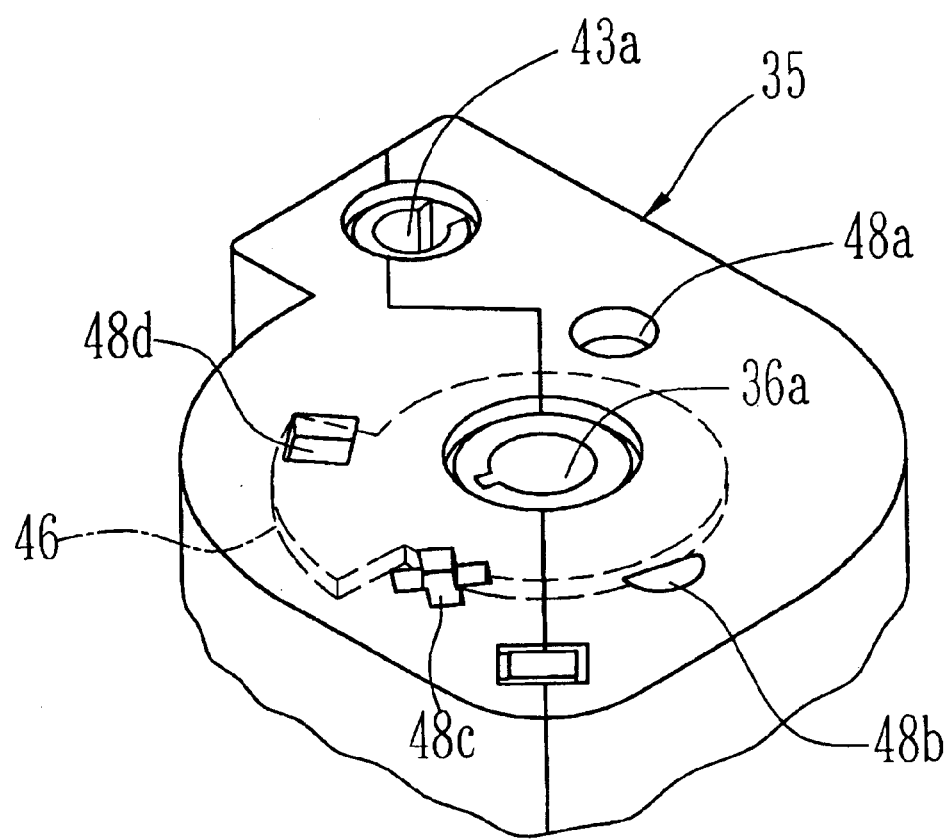
FIG. 8 shows a fragmentary perspective view of the photo film cartridge as viewed from the other end.

As shown in FIGS. 6A and 6B, a light-blocking door member 43 is disposed inside a film port 35a of the cartridge shell 35. The door member 43 has a rod-like shape with a flat middle portion, as shown in FIGS. 6A and 6B. The door member 43 is pivotal on an axis that extends in parallel to the spool 36 to rotate between an open position as shown in FIG. 6A, and a closed position as shown in FIG. 6B. As shown in FIGS. 7 and 8, opposite ends of the door member 43 are exposed to the outside of the cartridge shell 35, so a door drive shaft 75 (see FIG. 10) of the camera 2 may be engaged in an engaging hole 43a of the door member 43.

A data disc 45 and an index disc 46 are securely mounted on the opposite ends of the spool 36. The data disc 45 is provided with a bar code on its outer side, the bar code being representative of film data of the photo filmstrip 16, including film type, film speed, the number of available frames. As shown in FIG. 7B, the data disc 45 consists of a quiet zone 45a and a code section 45b. The quiet zone 45a has a smaller diameter than the code section 45b, and has no data thereon, whereas a pattern of black and white radial bars constituting the bar code is formed on the code section 45b. The bar code is exposed through cutouts 35b that is formed through one of the end faces of the cartridge shell 35, so a bar code reader 47 may read the bar code in the camera 2 or in a photographic printer.

Figure 9:
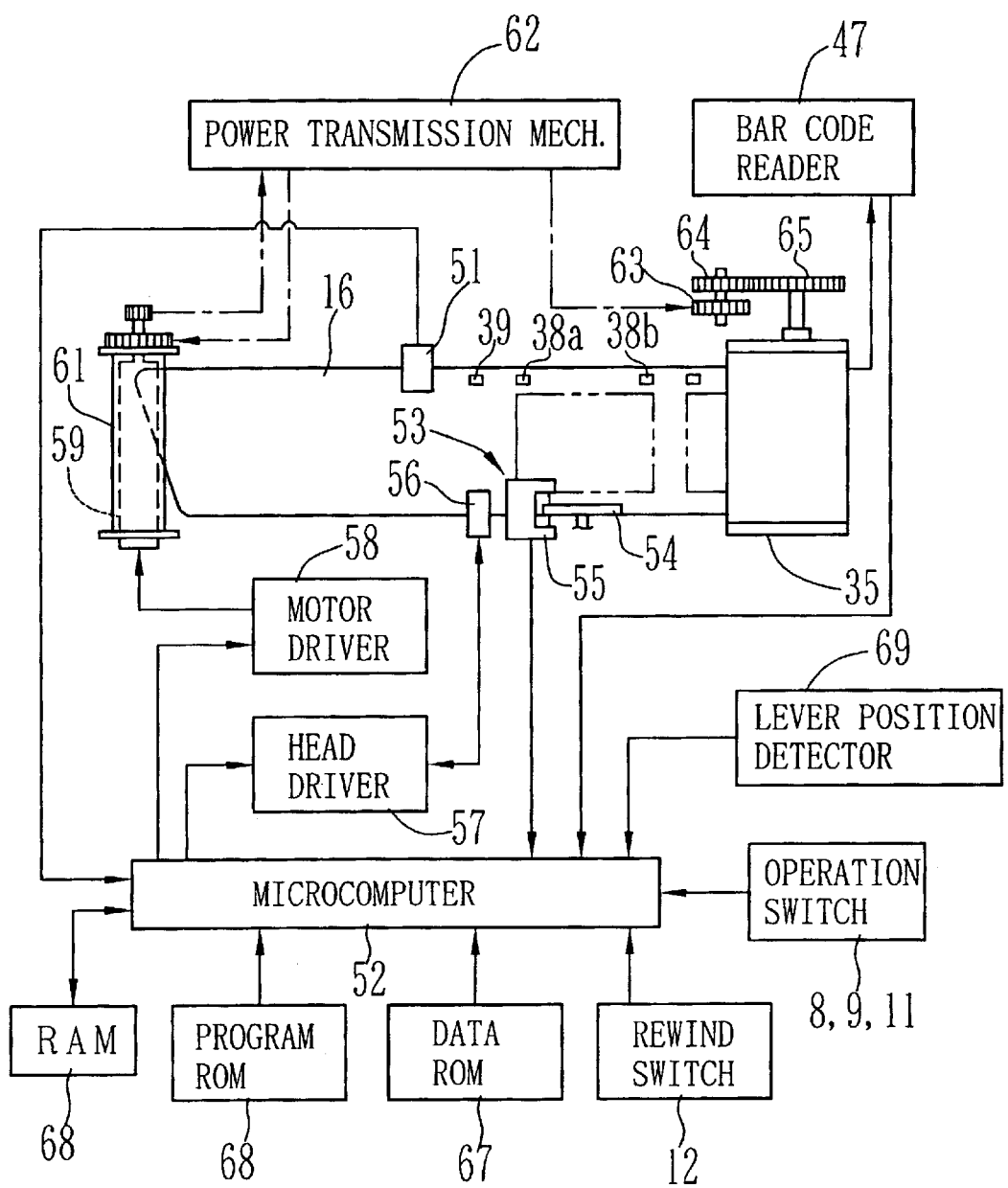
FIG. 9 shows a block diagram illustrating the circuitry of the camera of FIG. 1.

For example, the bar code reader 47 consists of a light source for projecting light toward the data disc 45 and a photo sensor for receiving light reflected from the data disc 45. Because of the difference in reflectance between the black bar and the white bar, the bar code reader 47 alternately outputs a high level detection signal and a low level detection signal, and sends the detection signals to a microcomputer 52, as shown in FIG. 9. Then, the microcomputer 52 discriminates between the black bars and the white bars depending upon the signal level. The quiet zone 45a has an approximately equal reflectance to that of the black bars, but extends through a remarkably larger angle than the black bars. Accordingly, the bar code reader 47 does not detect the white bar for a certain rotational angle of the data disc 45 that is defined by the quiet zone 45a, so the microcomputer 52 may distinguish the quiet zone 45a from the black bar. In this way, the black and white bars and the quiet zone 45a are detected on the basis of the detection signals from the bar code reader 47 and the rotational amount of the data disc 45.

The index disc 46 is for indicating condition of usage of the photo film cartridge 14. As shown in FIG. 8, the index disc 46 has a sector of a larger radius, and four index openings 48a, 48b, 48c and 48d of different shapes are formed through the other of the end faces of the cartridge shell 35, such that the sector of the index disc 46 may be viewed through one of these index openings 48a to 48d. If the index disc 46 is visible through the round opening 48a, it shows that the photo film cartridge 14 has never been exposed. If the index disc 46 is visible through the semi-circular opening 48b, it shows that the photo filmstrip 16 of the photo film cartridge 14 has been partly exposed. If the index disc 46 is visible through the cross-shaped opening 48c, it shows that the photo filmstrip 16 of the photo film cartridge 14 has been fully exposed. If the index disc 46 is visible through the rectangular opening 48d, it shows that the photo filmstrip 16 of the photo film cartridge 14 has been developed.

Since the data disc 45 rotates together with the spool 36, it is possible to detect the rotational position of the spool 36 on the basis of the rotational position of the data disc 45. How to read the data disc 45 and determine the position of the spool 36 on the basis of the data disc position is described in detail, for example, in JPA Nos. 10-31243 and 10-39366.

Immediately after the photo film cartridge 14 is loaded, the spool 36 is rotated through a predetermined angle, so that the bar code reader 47 reads the bar code on the data disc 45. Simultaneously, the rotational position of the spool 36 at the start of this initial rotation is determined to detect the condition of use of the photo filmstrip 16. If it is determined based on the spool position that the photo film cartridge 14 is fully exposed or developed, the spool 36 is reset to the position corresponding to the film condition. In that case, the photo filmstrip 16 is not advanced out of the cartridge shell 35, and a warning indicia is displayed on the LCD panel 7. Also when the camera 2 fully rewinds the 16 into the cartridge shell 35, the camera 2 rotates the spool 36 further in the rewinding direction to stop the index disc 46 at the corresponding position to the used condition of the photo filmstrip 16, i.e. partly exposed or fully exposed. The positioning at the end of rewinding is also controlled with reference to the detection signals from the bar code reader 47.

As shown in FIG. 9, a perforation sensor 51 is disposed in a film transport path, so as to detect the perforations 38a, 38b and 39 of the photo filmstrip 16. As an example, the perforation sensor 51 consists of an infrared light source and a photo receiving section that outputs a photoelectric signal whose level corresponds to the intensity of the received light. The photoelectric signal from the perforation sensor 51 is converted into a binary signal, and is sent to the microcomputer 52. For example, the binary signal has a low level when the perforation sensor 51 detects the perforation, or otherwise a high level signal.

A rotary encoder 53 is provided for detecting the advanced length of the photo filmstrip 16. The rotary encoder 53 consists of a not-shown friction roller, an encoder disc 54 and a photo sensor 55. The friction roller is kept in contact with the photo filmstrip 16 and rotates along with the movement of the photo filmstrip 16. The encoder disc 54 rotates together with the friction roller, and has radial slits arranged at regular intervals around the disc 54. The photo sensor 55 consists of a light projector and a light receiver disposed on opposite sides of the encoder disc 54, so as to detect the slits of the encoder disc 54 one by one while the encoder disc 54 is rotating. Accordingly, the photo sensor 55 outputs an encode pulse to the microcomputer 52 each time the photo filmstrip 16 is fed by a predetermined length. On the basis of the encode pulses, the microcomputer 52 measures the advanced length of the photo filmstrip 16, or controls a film transport mechanism for fine-adjustment of the position of the frame exposure area in the exposure position.

A magnetic head 56 is disposed beside the rotary encoder 53, such that the magnetic head 56 is in contact with the magnetic track 40 of the photo filmstrip 16. As the photo filmstrip 16 is wound up onto a take-up spool 61 in the film chamber, the magnetic head 56 is driven by a head driver 57 to write data of various kinds, which are supplied from the microcomputer 52, as binary codes on the magnetic tracks 40 in association with the related picture frames. More specifically, binary codes representative of exposure control data, print order data, frame title data and so forth are supplied from the microcomputer 52 to the head driver 57 after each exposure, so the head driver 57 drives the magnetic head 56 on the basis of these binary codes. During the magnetic recording on the basis of the encoder pulses, the microcomputer 52 calculates the film advancing speed, and drives the magnetic head 56 at the timing synchronized with the film advancing speed. Thereby, recording lengths of respective bits are maintained constant on the magnetic track 40.

The magnetic head 56 may be retractable away from the film transport path, so that the magnetic head 56 may be brought into contact with the photo filmstrip 16 only for magnetic recording, reading, or data erasing.

The film transport mechanism is driven by a feed motor 59 that is mounted inside the take-up spool 61 and is controlled by the microcomputer 52 via a motor driver 58. The feed motor 59 may be a pulse motor. In that case, the rotational amount of the feed motor 59 is detected by counting drive pulses applied to the feed motor 59. Where the feed motor 59 is a DC motor, an encoder disc having equally spaced radial slits is securely mounted to a rotary shaft of the motor 59, and a photo sensor detects the slits to determine the rotational amount of the feed motor 59. The driving force of the feed motor 59 is transmitted through a power transmission mechanism 62 to the spool 36 of the photo film cartridge 14 or the take-up spool 61.

The power transmission mechanism 62 is constituted of a reduction gear train and a planetary gear unit, though they are not shown in the drawings. Through the planetary gear unit, the feed motor 59 is coupled to the take-up spool 61 and a transmission gear 63 while the feed motor 59 is rotating in a forward direction. The transmission gear 63 is connected to the spool 36 of the photo film cartridge 14 via a drive gear 64 and a spool drive member 65, and the forward rotation of the feed motor 59 causes the spool 36 to rotate in the film advancing direction and causes the take-up spool 61 in a winding direction. While the feed motor 59 is rotating in a reverse direction, the planetary gear unit transmits the rotational movement of the feed motor 59 to the transmission gear 63 alone, and causes the spool 36 to rotate in the rewinding direction to rewind the photo filmstrip 16 into the photo film cartridge 14.

It is to be noted that the winding speed of the take-up spool 61 is set slightly higher than the film advancing speed out of the photo film cartridge 14, so the take-up spool 61 applies a certain amount of tension to the photo filmstrip 16 during the film advancing. However, the transmission gear 63 is coupled to the planetary gear unit through a not-shown clutch mechanism. If the film advancing speed of the spool driver 65 differs from the winding speed of the take-up spool 61, the clutch mechanism lets the spool driver 65 idle to absorb the difference, so that the photo filmstrip 16 may not be loosened or too tensed.

The rewind switch 12 and other operation switches 8, 9 and 11 are connected to the microcomputer 52. Connected to the microcomputer 52 are also a program ROM 66 storing control programs, a data ROM 67 storing control data of various kinds, and a RAM 68 for storing temporarily data of various kinds as obtained during the operations. A lever position detector 69 and a not-shown cartridge detection switch are also connected to the microcomputer 52. The cartridge detection switch is disposed inside the cartridge chamber 15, and is turned on when the photo film cartridge 14 is loaded. The lever position detector 69 detects the position of the interconnection lever 33, and judges by the lever position whether the lid 18 is open or closed.

Figure 10:
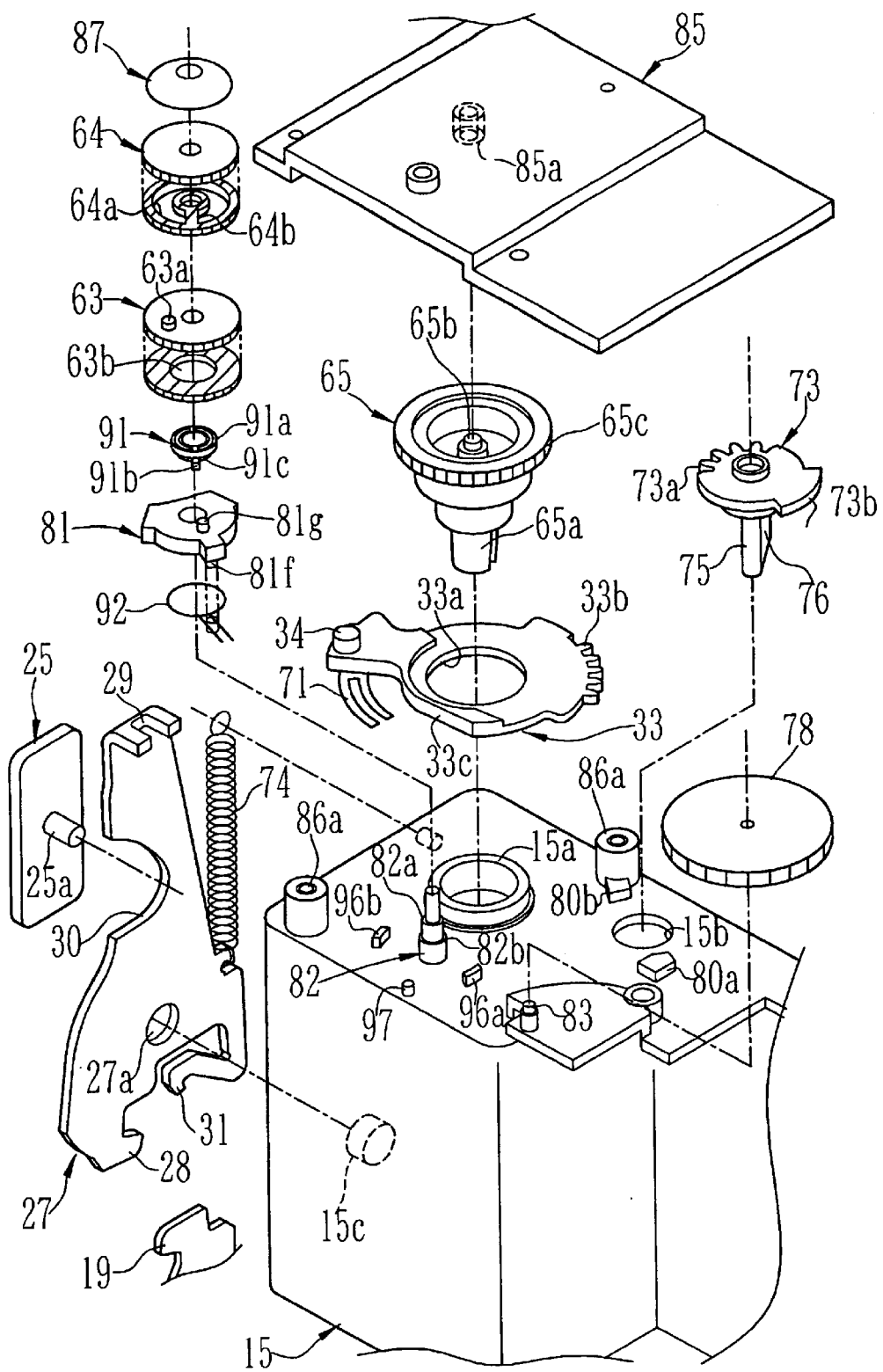
FIG. 10 shows an exploded perspective view of a safety-lock mechanism of the camera.
Figure 11:
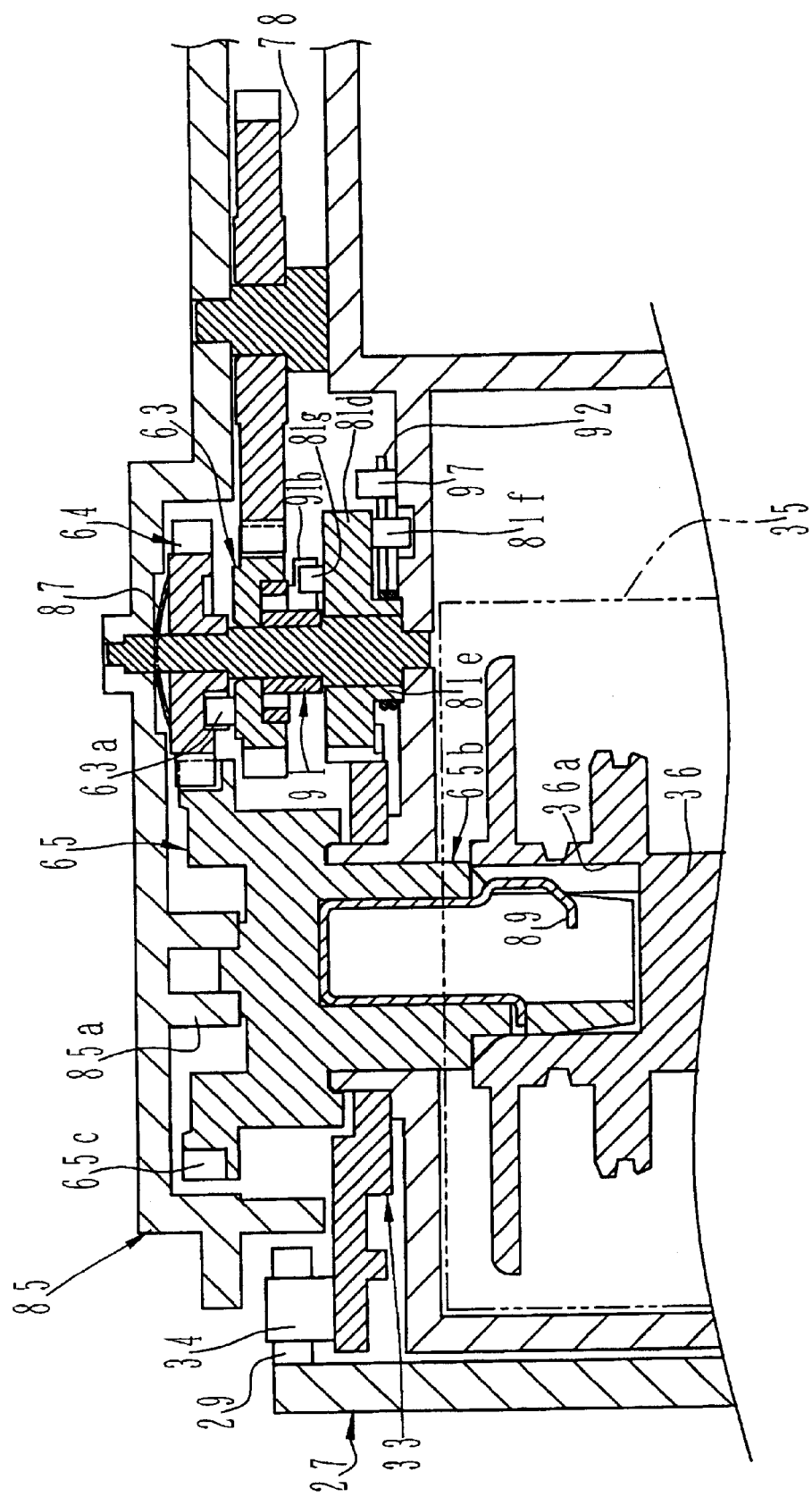
FIG. 11 shows a sectional view illustrating essential parts of the safety-lock mechanism.

As shown in FIGS. 10 and 11, the interconnection lever 33 is shaped into a disc with around center hole 33a. The center hole 33a is fitted on a boss 15a that is formed around a center hole of the top wall of the cartridge chamber 15, such that the interconnection lever 33 may rotate about the boss 15a. The connection pin 34 is formed on the top of the interconnection lever 33, and a drive gear 33b is formed across a circumferential section of the interconnection lever 33 that is located on the opposite side from the connection pin 34. Another circumferential section of the interconnection lever 33 constitutes a locking cam portion 33c. A metal brush 71 is affixed to the interconnection lever 33 in proximity to the connection pin 34.

As described with reference to FIGS. 3 and 4, the connection pin 34 is interlocked with the fork 29 of the latch lever 27. The brush 71 is in contact with a printed circuit board that is not shown but mounted on the top of the cartridge chamber 15. The printed circuit board has a plurality of contacts thereon, and the brush 71 comes into contact with different ones of the contacts as the interconnection lever 33 rotates. Thus, the brush 71 and the printed circuit board constitute the lever position detector 69.

The drive gear 33b of the interconnection lever 33 meshes with a gear section 73a of a cartridge door driver 73. The cartridge door driver 73 has the door drive shaft 75 on its bottom side, and a cam projection 76 is formed on an upper section of the door drive shaft 75. The door drive shaft 75 is put through a top-side hole 15b into the cartridge chamber 15 such that the cartridge door driver 73 may rotate inside the hole 15b. The door drive shaft 75 is then engaged with the door member 43 of the photo film cartridge 14 with the cam projection 76 fitted in a slit of the engaging hole 43a. Thus, the rotational movement of the cartridge door driver 73 is transmitted to the door member 43.

Figure 12:
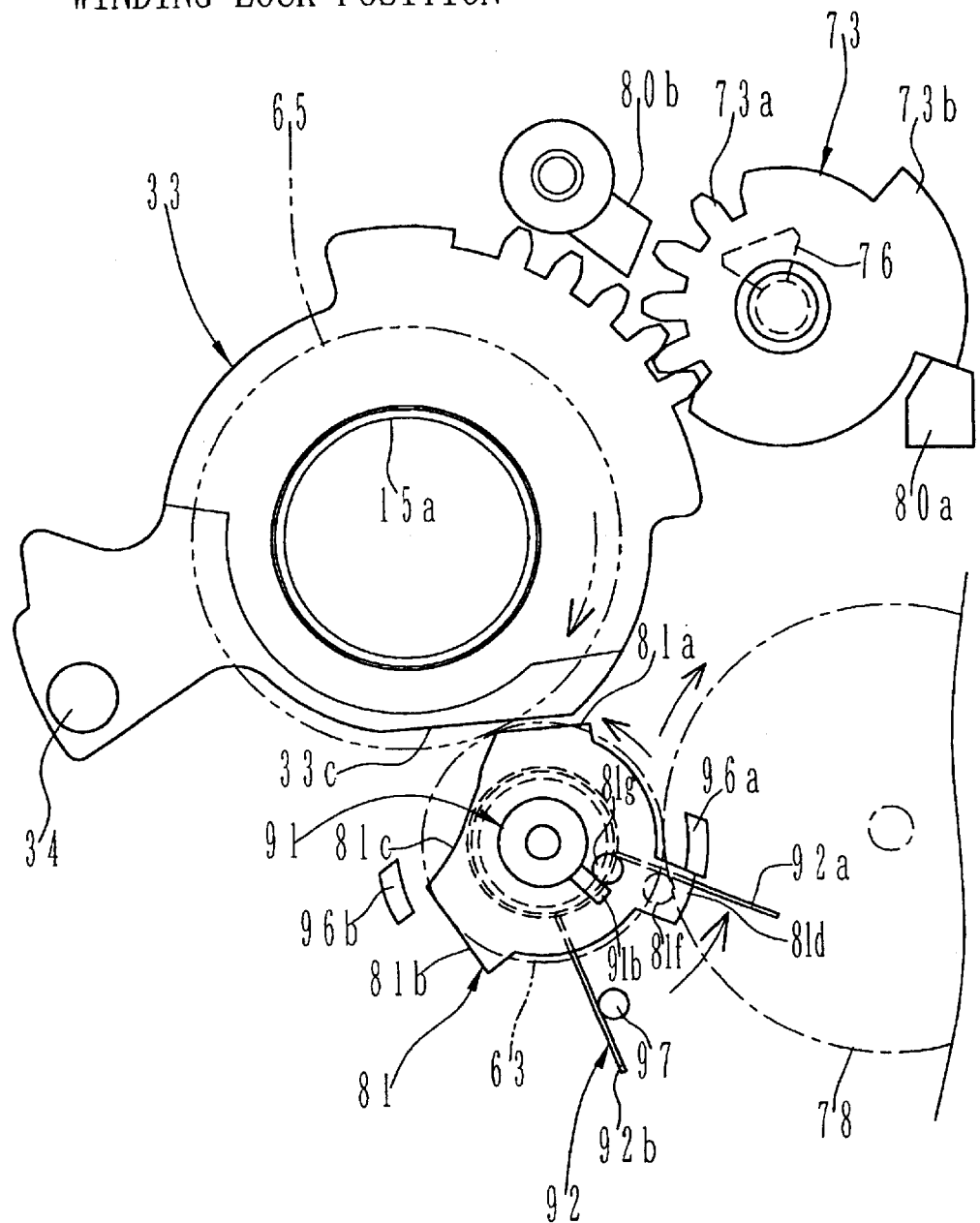
FIG. 12 shows an explanatory diagram illustrating the safety-lock mechanism in a winding lock position for preventing opening the lid of the cartridge chamber while the filmstrip is being advanced out of the cartridge shell.
Figure 14:
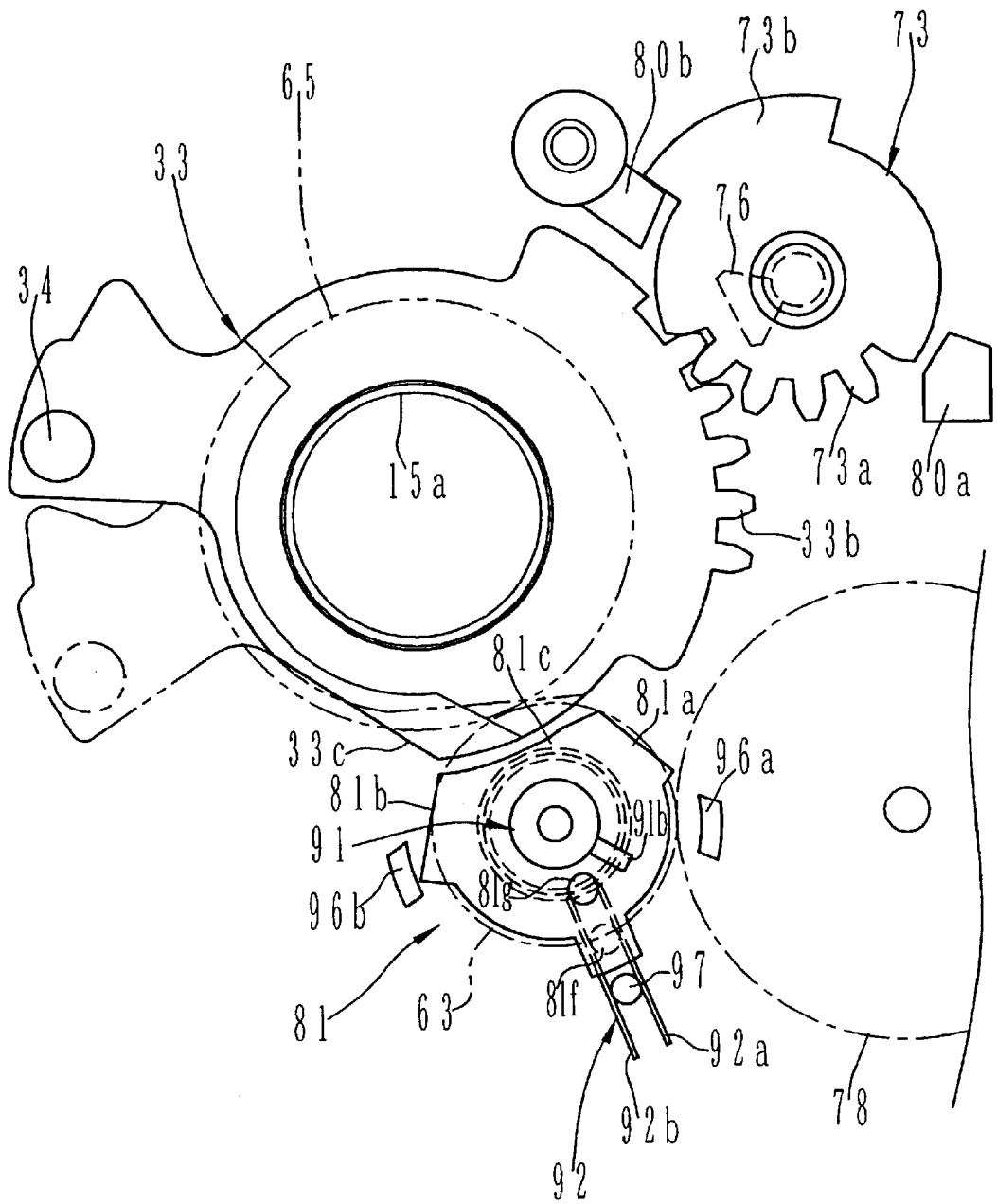
FIG. 14 shows an explanatory diagram illustrating the safety-lock mechanism in an unlock position where the lid of the cartridge chamber is permitted being opened.

The cartridge door driver 73 has a projection 73b on the opposite circumferential portion from the gear section 73a, and stoppers 80a and 80b are formed on the top of the cartridge chamber 15 in the orbit of the projection 73b. As the cartridge door driver 73 rotates clockwise, the projection 73b finally comes into contact with the stopper 80a, as shown in FIG. 12, and this position corresponds to the open position of the door member 43. Likewise, the projection 73b finally comes into contact with the stopper 80b as the cartridge door driver 73 rotates counterclockwise, as shown in FIG. 14, and this position corresponds to the closed position of the door member 43. Thus, the angular range of the rotation of the cartridge door driver 73 is limited.

With the swing of the latch lever 27, the interconnection lever 33 rotates, and the rotational movement of the interconnection lever 33 is transmitted to the cartridge door driver 73 through the engagement between the drive gear 33b and the gear section 73a, so the door member 43 rotates between the closed position and the open position. According to this configuration, when the slider 25 is slid up to open the lid 18, the door member 43 is automatically closed. Thus, the photo filmstrip 16 would not be unexpectedly exposed at the time of opening the lid 18.

On the top of the cartridge chamber 15 are also mounted the transmission gear 63, the drive gear 64, the spool driver 65 and a lock member 81. A gear 78 of the power transmission mechanism 62 is also mounted on the top of the cartridge chamber 15, and meshes with the transmission gear 63. The transmission gear 63 transmits the rotational movement of the feed motor 59 to the drive gear 64 and the lock member 81. The spool driver 65 has a gear section 65c formed around its upper rim, and a drive shaft 65a on its bottom. The gear section 65c meshes with the drive gear 64, so the drive gear 64 drives the spool driver 65. The lock member 81 is a member of a safety-lock mechanism that locks the interconnection lever 33 immovable while the photo filmstrip 16 is being transported, thereby to stop the latch lever 27 from swinging and thus lock the lid 18 in the closed position.

The spool driver 65 is rotatably put through the center hole of the top wall of the cartridge chamber 15, that is formed inside the boss 15a, so the drive shaft 65a protrudes into the cartridge chamber 15. The drive gear 64, the transmission gear 63 and the lock member 81 are rotatably fit on a pivot axle 82 that is mounted on the top of the cartridge chamber 15. The gear 78 is rotatably fit on a pivot axle 83 that is formed on the top of the cartridge chamber 15. The pivot axle 82 has gradually upwardly reduced diameters, so that two steps 82a and 82b are formed around the pivot axle 82. The drive gear 64 is held at the upper step 82a, and the transmission gear 63 is held at the lower step 82b, whereas the lock member 81 is fit around the base of the pivot axle 82. Upper tips of the pivot axles 82 and 83 are secured by a top plate 85 that is mounted above the cartridge chamber 15. The top plate 85 has a circular boss 85a formed on its bottom side. A boss 65b of the spool driver 65, which is formed on the top side and located at the rotational center of the spool driver 65, is rotatably fitted in the circular boss 85a. The top plate 85 is screwed to bosses 86a and 86b that are formed on the top of the cartridge chamber 15.

A pressure disc 87 is disposed between the drive gear 64 and the top plate 85. The pressure disc 87 presses the drive gear 64 onto the step 82a, thereby to prevent the drive gear 64 from rotating accidentally in response to vibrations, shocks or impacts. As the spool driver 65 meshes with the drive gear 64, the spool driver 65 and thus the spool 36 of the photo film cartridge 14 would not rotate accidentally.

A pin 63a is provided on the top of the transmission gear 63, whereas the drive gear 64 is formed with a substantially circular groove 64a and a stop edge 64b that is brought into contact with the pin 63a through a limited angle of rotation of the transmission gear 63. The pin 63a and the stop edge 64b constitute a delayed-transmission mechanism. That is, the rotational movement of the transmission gear 63 is not transmitted to the drive gear 64 and thus to the spool driver 65 unless the pin 63a comes into contact with the stop edge 64b. More specifically, as the transmission gear 63 rotates, the pin 63a moves along the groove 64a through a constant angle less than 360 degrees, and comes into contact with the stop edge 64b. While the transmission gear 63a is moving along the groove 64a, the rotational movement of the transmission gear 63 is not transmitted to the drive gear 64. After the pin 63 comes into contact with the stop edge 64b, the drive gear 64 rotates together with the transmission gear 63, so the rotational movement of the transmission gear 63 is transmitted to the spool driver 65. When the rotational direction of the feed motor 59 is turned over, the pin 63a removes from the stop edge 64b and moves along the groove 64a in the opposite direction. Thereafter when the pin 63a comes into contact with the stop edge 64b, the reverse rotational movement of the transmission gear 63 begins to be transmitted to the spool driver 65.

This delay time is utilized for transmitting the rotational movement of the transmission gear 63 to the lock member 81, for the purpose of bringing the safety-lock mechanism to an unlock position, as will be described in detail later. As being held at the step 82a of the pivot axle 82, the drive gear 64 is out of contact with the transmission gear 63 except when the pin 63a comes to contact with the stop edge 64b. According to this configuration, even though the safety-lock mechanism is unlocked by use of the rotational movement of the transmission gear 63, the drive gear 64 would not rotate during this unlocking operation, so the spool driver 65 and thus the spool 36 would not be unexpectedly rotated.

Inside the drive shaft 65a of the spool driver 65 is mounted a fastening plate 89 that is brought into engagement with a key groove 36b of an engaging hole 36a that is formed in either end face of the spool 36. The fastening plate 89 is made of a resilient metal strip, and may be resiliently pushed into the drive shaft 65. Accordingly, even while the position of the key groove 36b of the spool 36 does not match to the fastening plate 89 when the photo film cartridge 14 is loaded in the cartridge chamber 15, the engaging hole 36a may be fit on the drive shaft 65a. Thereafter when the drive shaft 65a rotates to a position where the fastening plate 89 is in face of the key groove 36b, the fastening plate 86 rebounds into engagement with the key groove 36b, so the drive shaft 65a and the spool 36 begin to rotate together.

Besides the lock member 81, a lever member 91 and an unlock spring 92 constitute the safety-lock mechanism. The lever member 91 and the unlock spring 92 are placed over and under the lock member 81 respectively, and rotatable about the pivot axle 82. A round recess 63b is formed in the bottom of the transmission gear 63, and a round force-fitting portion 91a of the lever member 91 is force fitted into the round recess 63b. Thereby, the lever member 91 is frictionally coupled to the transmission gear 63. The lever member 91 has a lever portion 91b and an axle 91c formed integrally on the bottom of the force-fitting portion 91a. The lever portion 91b transmits the rotational movement of the transmission gear 63 to the lock member 81, and the axle 91c is rotatably put in the lock member 81.

Figure 13:
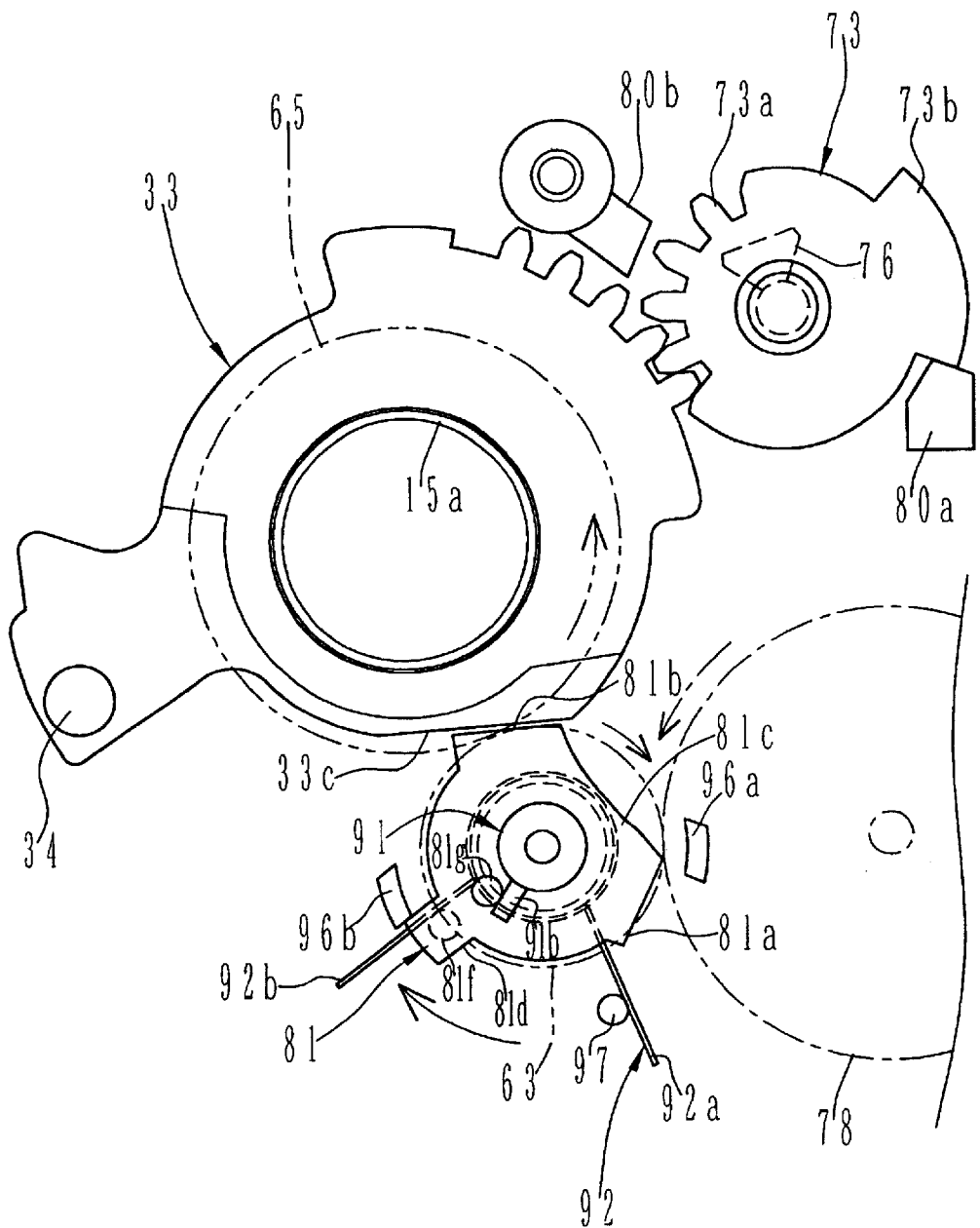
FIG. 13 shows an explanatory diagram illustrating the safety-lock mechanism in a rewinding lock position for preventing opening the lid of the cartridge chamber while the filmstrip is being rewound into the cartridge shell.

As shown in FIG. 12, the lock member 81 has a winding lock protuberance 81a, a rewinding lock protuberance 81b, a relief 81c and a stopper lug 81d. The winding lock protuberance 81a, the rewinding lock protuberance 81b and the stopping lug 81d protrude radially outward, and the relief 81c is recessed radially inward. The lock member 81 rotates between a winding lock position as shown in FIG. 12, a rewinding lock position as shown in FIG. 13, and a unlock position as shown in FIG. 14. A pair of stopper pins 96a and 96b are formed on the top of the cartridge chamber 15 in the vicinity of the pivot axle 82. The stopper lug 81d comes into contact with the stopper pin 96a or 96b at the winding lock position or at the rewinding lock position respectively.

In the winding lock position, the winding lock protuberance 81a protrudes into the orbit of the interconnection lever 33, and comes into contact with the locking cam portion 33c of the interconnection lever 33, stopping the interconnection lever 33 from rotating in a clockwise direction in FIG. 12, as shown by an arrow, that corresponds to the winding direction of the take-up spool 61 and the film advancing direction of the spool 36. Thereby, the lid 18 is latched in the closed position. In the rewinding lock position, the rewinding lock protuberance 81b protrudes into the orbit of the interconnection lever 33, and comes into contact with so the locking cam portion 33c of the interconnection lever 33, stopping the interconnection lever 33 from rotating in a counterclockwise direction in FIG. 13, as shown by an arrow, that corresponds to the rewinding direction of the spool 36.

The lock member 81 comes to the unlock position on the way of rotating from the winding lock position to the rewinding lock position, or vise versa. In the unlock position, the relief 81c is opposed to the interconnection lever 33, and the lock member 81 is set back from the orbit of the interconnection lever 33, so the interconnection lever 33 is released from the safety-lock mechanism, and allowed to rotate.

As shown in FIG. 11, the lock member 81 has a hub 81e formed on its bottom, and the unlock spring 92 is rotatably fitted on the hub 81e. A pin 81f is formed on the bottom of the stopper lug 81d, and both ends 92a and 92b of the unlock spring 92 are engaged with the pin 81f. As the ends 92a and 92b of the unlock spring 92 are biased toward each other, the pin 81f is nipped between these ends 92a and 92b. When the lock member 81 is initially mounted on the pivot axle 82, the lock member 81 is oriented such that the ends 92a and 92b of the unlock spring 92 nip a pin 97 that is formed on the top of the cartridge chamber 15, as shown in FIG. 14.

That is, the lock member 81 is initially mounted in the unlock position. As the lock member 81 rotates, one of the ends 92a and 92b is pushed by the pin 81f to remove from the pin 97, while the other remains being engaged with the pin 97. As a result, the ends 92a and 92b are resiliently removed from each other, generating an urging force in a direction to return the lock member 81 to the unlock position.

A pin 81g is formed on the top of the lock member 81, and is brought into contact with the lever portion 91b of the lever member 91 when the lever member 91 rotates by a predetermined angle together with the transmission gear 63. Then, the rotational movement of the transmission gear 63 is transmitted to the lock member 81, causing the lock member 81 to rotate together with the lever member 91 against the urging force of the unlock spring 92. When the lock member 81 rotates to bring the stopper lug 81d into contact with one of the stopper pins 96a and 96b, the lever member 91 begins to slip on the transmission gear 63, and the transmission gear 63 alone continues rotating. Consequently, while the transmission gear 63 is rotating, the lock member 81 is held in the winding lock position or the rewinding lock position.

Once the lock member 81 is brought to the winding lock position or the rewinding lock position, the lock member 81 does not return to the unlock position but is held at the winding lock position or the rewinding lock position even after the transmission gear 63 stops, in spite of the urging force of the unlock spring 92 in the direction to return the lock member 81 to the unlock position. This is because the power of friction between the transmission gear 63 and the lever member 91 is stronger than the urging force of the unlock spring 92. So long as the transmission gear 63 stops, the lever member 91 and thus the lock member 81 do not rotate. First when the transmission gear 63 starts rotating in the reverse direction to the previous rotational direction, the lock member 81 at the winding lock position or the rewinding lock position begins to rotate along with the lever member 91, according to the urging force of the unlock spring 92, and thus returns to the unlock position.

As described above, after the photo filmstrip 16 is fully rewound into the photo film cartridge 14, the spool 36 is further rotated in the rewinding direction to stop the spool 36 and thus the index disc 46 at the position corresponding to the condition of use of the photo film cartridge 14. During this operation, hereinafter called the spool position control operation, the lock member 81 is held at the rewinding lock position. Thereafter, the stop position of the spool 36 should be maintained unchanged even while the lock member 81 is returned to the unlock position to permit opening the lid 18. That is, the lock member 81 should return to the unlock position before the rotational movement of the transmission gear 63 begins to be transmitted to the drive gear 64.

According to the configuration of the present embodiment, according to the urging force of the unlock spring 92, the lock member 81 begins to rotate from the rewinding lock position to the unlock position concurrently with the start of rotation of the transmission gear 63 in the winding direction, and reaches the unlock position before the transmission gear 63 rotates halfway. Because of the above-described delayed-transmission mechanism between the transmission gear 63 and the drive gear 64, the rotational movement of the transmission gear 63 begins to be transmitted to the drive gear 64 after the transmission gear 63 almost makes one revolution in the opposite rotational direction. Accordingly, while the transmission gear 63 is rotating to bring the lock member 81 to the unlock position, the rotational movement of the transmission gear 63 would not be transmitted to the drive gear 64, so the stop position of the spool 36 is maintained unchanged.

The unlock spring 92 also contributes to reducing the requisite accuracy in controlling the driving amount of the feed motor 59 for the releasing of the safety-lock mechanism. Namely, without the unlock spring 92, it would be necessary to control the rotational amount of the transmission gear 63 with accuracy in accordance with the rotational amount of the lock member 81 from the rewinding lock position to the unlock position, for stopping the lock member 81 at the unlock position. To control the rotational amount of the transmission gear 63 accurately, the driving amount of the feed motor 59 should be controlled accurately. On the contrary, the unlock spring 92 makes the lock member 81 stop at the unlock position even if the accuracy in controlling stop-position of the feed motor 59 is not so high, and the transmission gear 63 may rotate a little further after the lock member 81 reaches the unlock position.

The embodiment having the above described configurations operates as follows:

Before the photo film cartridge 14 is loaded in the cartridge chamber 15, the lock member 81 is set at the unlock position as shown in FIG. 14, so the interconnection lever 33 is allowed to rotate. Since the lock member 81 is urged by the unlock spring 92 to stop at the unlock position, the lock member 81 would not rotate accidentally. Where the lid 18 is closed, the interconnection lever 33 is in a position as shown by phantom lines in FIG. 14. In this position, the engaging arm 28 of the latch lever 27 is held engaged with the hook 19 of the lid 18 according to the urging force of the coiled spring 74, as shown in FIG. 3, so the slider 25 is placed in the bottom end of the slit 2*a*.

As the slider 25 is slid upward, the latch lever 27 swings against the force of the coiled spring 74, as shown in FIG. 4, there by disengaging the engaging arm 28 from the hook 19. Then, the resilient arm 31 pushes the hook 19 outward, to open the lid 18. The swing of the latch lever 27 is transmitted to the interconnection lever 33, causing the interconnection lever 33 to rotate clockwise from the position shown by phantom lines to a position shown by a solid line in FIG. 14. Because of the engagement between the gear 33*b* and the gear 73*a*, the cartridge door driver 73 also rotates counterclockwise to the position shown in FIG. 14, that corresponds to the closed position of the door member 43.

After the lid 18 is opened up, the photo film cartridge 14 is loaded in the cartridge chamber 15 as shown in FIG. 1. In the cartridge chamber 15, the engaging hole 36*a* of the spool 36 is engaged with the drive shaft 65*a* of the spool driver 65, and the engaging hole 43*a* of the door member 43 is engaged with the drive shaft 75 of the cartridge door driver 73. Then, the cartridge detection switch is turned on to output a detection signal to the microcomputer 52. Thereafter when the lid 18 is closed, the hook 19 of the lid 18 is engaged with the engaging arm 28 of the latch lever 27, thereby latching the lid 18 in the closed position.

Simultaneously with the latching of the lid 18, the interconnection lever 33 is rotated counterclockwise to the position shown in FIGS. 12 and 13, that is equivalent to the position shown by the phantom lines in FIG. 14, and corresponds to the closed position of the lid 18. When the interconnection lever 33 comes to this closed position, the lever position detector 69, consisting of the brush 71 and the not-shown printed circuit board, outputs a detection signal to the microcomputer 52. Upon receipt of this detection signal, the microcomputer 52 considers that the photo film cartridge 14 is loaded properly, and starts operations to prepare for the photography. As the interconnection lever 33 rotates to the closed position, the cartridge door driver 73 rotates clockwise to the position as shown in FIGS. 12 and 13, thereby opening the door member 43 of the photo film cartridge 14.

The first process conducted after loading the photo film cartridge 14 is reading film data and detecting the condition of use of the photo film cartridge 14. The condition of use of the photo film cartridge 14 is detected while driving the spool 36 in the rewinding direction, so the microcomputer 52 drives the feed motor 59 to rotate in the reverse direction that corresponds to the rewinding direction. The rotational movement of the feed motor 59 in the reverse direction is transmitted through the power transmission mechanism 62 to the transmission gear 63, but not to the take-up spool 61.

As a result, the transmission gear 63 begins to rotate clockwise, as shown in FIG. 13, so the lever member 91 rotates together with the transmission gear 63. As the lever portion 91*b* comes into contact with the pin 81*g* during this rotation of the lever member 91, the lock member 81 is caused to rotate to the rewinding lock position against the urging force of the unlock spring 92. Because the rewinding lock protuberance 81*b* is opposed to the locking cam portion 33c in the rewinding lock position, the interconnection lever 33 is stopped from rotating, so the lid 18 is locked in the closed position.

On the other hand, when the pin 63a of the transmission gear 63 comes into contact with the stop edge 64b of the drive gear 64, the drive gear 64 begins to rotate, causing the spool driver 65 and thus the spool 36 to rotate in the rewinding direction. While the spool 36 is rotating in the rewinding direction, the bar code reader 47 reads the bar code on the data disc 45 that rotates together with the spool 36. On the basis of the bar code read out through the bar code reader 47, the microcomputer 52 determines the film type, the number of available exposures, the film speed and other film data. The microcomputer 52 also calculates a stop position of the spool 36 from the initial position of the data disc 45 at the loading, and determines the condition of use of the photo film cartridge 14 on the basis of the stop position of the spool 36. The data obtained through these processes are stored in the RAM 68, for use in controlling photographic processes.

After the clockwise rotation of the transmission gear 63 brings the lock member 81 to the rewinding lock position, the lever member 91 stops rotating as its lever portion 91b is stopped by the pin 81g of the lock member 81. On the contrary, since the transmission gear 63 is frictionally coupled to the lever member 91, the transmission gear 63 continues to rotate while slipping on the lever member 91. Because of the friction with the transmission gear 63, the lever member 91 is held in the position as shown in FIG. 13. Since the friction between the transmission gear 63 and the lever member 91 is stronger than the urging force of the unlock spring 92, the lock member 81 does not return to the unlock position even after the transmission gear 63 stops.

When it is determined that the loaded film cartridge 14 is unexposed or partly exposed, the microcomputer 52 executes a first frame setting process for positioning an appropriate one of unexposed frame exposure areas of the photo filmstrip 16 behind the taking lens 3 in a manner as set forth in detail below. If the photo film cartridge 14 is determined to be fully exposed or developed, the microcomputer 52 resets the spool 36 and thus the index disc 46 to the initial stop position corresponding to the condition of use, and unlock the safety-lock mechanism in a manner as set forth in detail below, to permit unloading the photo film cartridge 14. It is preferable to display a particular warning on the LCD 7 or sound an alarm when the loaded film cartridge 14 is already exposed to the full or developed.

The first frame setting process is executed by driving the feed motor 59 in the forward direction to rotate the transmission gear 63 and the take-up spool 61 in the winding direction, that is, the counterclockwise direction of the transmission gear 63 in FIG. 12. As a result, the lever member 91 rotates together with the transmission gear 63. Then the lever portion 91b removes from the pin 81g, so the lock member 81 rotates along with the lever member 91 according to the urging force of the unlock spring 92, and reaches the unlock position. Thereafter when the lever member 91 rotates almost through 360 degrees, the lever portion 91b comes into contact with the pin 81g again, starting pushing the lock member 81 to the winding lock position as shown in FIG. 12, against the urging force of the unlock spring 92. Because the winding lock protuberance 81a is opposed to the locking cam portion 33c of the interconnection lever 33 in the winding lock position of the lock member 81, the lid 18 is locked in the closed position.

On the other hand, as the pin 63a of the transmission gear 63 comes into contact with the stop edge 64b, the drive gear 64 begins to rotate in the winding direction. Then, the spool driver 65 and thus the spool 36 of the photo film cartridge 14 rotates in the film advancing direction to advance the photo filmstrip 16 out through the film port 35a of the cartridge shell 35. While the photo filmstrip 16 is passing through the film passageway, the perforation sensor 51 detects the perforation 39 formed in the film leading end. If the perforation sensor 51 does not detect the perforation 39 within a predetermined time after the start of film advancing operation, the microcomputer 52 judges that the photo filmstrip 16 is not normally advanced out of the cartridge shell 35, and drives the feed motor 59 in the rewinding direction to rewind the photo filmstrip 16 into the cartridge shell 35. It is preferable to notify this error as an indicia on the LCD 7 or an alarm. After the photo filmstrip 16 is fully rewound into the cartridge shell 35, the spool 36 is further rotated in the rewinding direction to stop the data disc 46 at the position corresponding to the condition of use of the photo film cartridge 14, that is detected before the film advancing. Thereafter, the microcomputer 52 unlocks the safety-lock mechanism.

When the photo filmstrip 16 is normally advanced to the take-up spool 61, the leading end is automatically wound around the take-up spool 61 as the take-up spool 61 rotates. Thereafter, the first one of unexposed frame exposure areas 37a to 37end is positioned behind the taking lens 3 in accordance with data read out from the magnetic tracks 40a to 40end.

After the lock member 81 is brought to the winding lock position in this first frame setting process, the lever member 91 stops rotating as its lever portion 91b is stopped by the pin 81g of the lock member 81. On the contrary, the transmission gear 63 continues to rotate while slipping on the lever member 91 since the transmission gear 63 is frictionally coupled to the lever member 91. Because the friction between the transmission gear 63 and the lever member 91 is stronger than the urging force of the unlock spring 92, the lock member 81 does not return to the unlock position even after the transmission gear 63 stops. Since the winding lock protuberance 81a is opposed to the cam portion 33c of the interconnection lever 33 in the winding lock position, the interconnection lever 33 is stopped from rotating, so the lid 18 would not be opened during the first frame setting process.

After the first frame setting process, the camera 2 is ready for photography. When the shutter button 4 is pressed, the frame exposure area positioned behind the taking lens 3 is exposed to photograph a latent image thereon. Then the microcomputer 52 drives the feed motor 59 in the forward direction to rotate the take-up spool 61 in the winding direction to wind up the just-exposed area into the film chamber, till the next unexposed frame exposure area is positioned behind the taking lens 3. While the photo filmstrip 16 is being wound up onto the take-up spool 61, the magnetic head 56 is driven through the head driver 57 to record photographic data on the magnetic track of the just-exposed area.

Since the lock member 81 continues to stop the interconnection lever 33 from rotating while the take-up spool 61 is winding up the photo filmstrip 16 by one frame, the lid 18 would not be opened. The lock member 81 is held in the winding lock position also while the transmission gear 63 stops before and after each film winding operation of the take-up spool 61.

When the last frame exposure area 40end of the photo filmstrip 16 is exposed, or the rewinding switch 12 is operated, the microcomputer 52 starts driving the feed motor 59 in the rewinding direction. Then the lock member 81 is rotated to the rewinding lock position, in the same way as described with respect to the process conducted immediately after loading the photo film cartridge 14, i.e. the process for reading film data and detecting the condition of use of the photo film cartridge 14. Thus, the lid 18 is prohibited from being opened during the rewinding operation.

After the photo filmstrip 16 is fully rewound into the cartridge shell 35, the feed motor 59 is further driven to rotate the spool 36 in the rewinding direction to position the data disc 46 in the position indicating the condition of use of the photo film cartridge 14. That is, if the photo filmstrip 16 is rewound as the all available exposures have been made, the data disc 46 is located under the opening 48c. On the other hand, if the photo filmstrip 16 is rewound in response to the rewinding switch 12, the data disc 46 is located under the opening 48b. The stop position control of the spool 36 is conducted with reference to the detection signals from the bar code reader 47 and the rotational amount of the feed motor 59. Since the lock member 81 is held in the rewinding lock position during this process, the lid 18 would not be opened.

Thereafter, the microcomputer 52 unlocks the safety-lock mechanism by driving the feed motor 59 in the forward direction to rotate the transmission gear 63 counterclockwise. When the rewinding and the stop position control of the spool 36 are completed, the lock member 81 is held in the rewinding lock position as shown in FIG. 13. Therefore, as the transmission gear 63 rotates counterclockwise, the lever member 91 rotates together in the counterclockwise direction, so the lock member 81 rotates along with the lever member 91 according to the force of the unlock spring 92, and reaches the unlock position. Thus, the lid 18 is allowed to be open.

For this unlocking operation, the feed motor 59 is rotated by a small amount enough for causing the lock member 81 to rotate from the rewinding lock position to the unlock position. Because of the urging force of the unlock spring 92, the lock member 81 reaches the unlock position before the rotational movement of the transmission gear 63 is transmitted to the drive gear 64, so the safety-lock mechanism is unlocked without the change of position of the spool 36 and that of the data disc 46.

Since the drive gear 64 is held at the step 82a of the pivot axle 82 by the pressure from the pressure disc 87, the drive gear 64 would not be rotated by the rotational movement of the transmission gear 63 unless the pin 63a of the transmission gear 63 comes into contact with the stop edge 64b of the drive gear 64. So the spool 36 is securely held in the stop position corresponding to the condition of use of the photo film cartridge 14. The pressure of the pressure disc 87 contributes to preventing the drive gear 64 from rotating accidentally in response to shocks or impacts which may be applied to the camera 2 as being carried about. Therefore, if the photo film cartridge 14 is not immediately removed from the camera 2 after the rewinding, the stop position of the spool 36 and that of the data disc 46 would not be displaced.

As the safety-lock mechanism is unlocked, the slider 25 can be slid upward, as show in FIG. 4, thereby making the latch lever 27 swing to disengage the engaging arm 28 from the hook 19, so the lid 18 is opened. With the swing of the latch lever 27, the interconnection lever 33 also rotates clockwise, as shown in FIG. 14, and causes the cartridge door driver 73 to rotate counterclockwise, so the door member 43 rotates from the open position to the closed position closing the film port 35a of the photo film cartridge 14. As the lid 18 is opened, the photo film cartridge 14 is pushed out of the cartridge chamber 15 by the eject mechanism 22, making easy to take the photo film cartridge 14 out of the cartridge chamber 15.

In the above embodiment, the position of the spool 36 is determined and controlled with reference to the detection signals from the bar code reader 47 and the rotational amount of the feed motor 59. But it is possible to provide a specific sensor for detecting the position of the spool 36, and control the stop position of the spool 36 with reference to signals from the sensor.

Although the present invention has been described with respect to the camera for the IX240 type film cartridge, the present invention is applicable to those cameras using the ISO135 type film cartridge.

Thus, the present invention is not to be limited to the above embodiments but, on the contrary, various modifications will be possible to those skilled in the art, without departing from the scope of claims attached hereto.

What is claimed is:

1. A camera comprising:
    a lid open-closed mechanism that moves to a latching position to latch a lid of a cartridge chamber when said lid is closed, and moves to an unlatching position to unlatch said lid in response to an opening operation thereon;
    a film transport mechanism driven by a feed motor to wind a photo filmstrip of a photo film cartridge as loaded in said cartridge chamber around a take-up spool and rewind the photo filmstrip into a cartridge shell; and
    a safety-lock mechanism comprising a lock member that is movable between first and second lock positions for locking said lid open-close mechanism in said latching position, and an unlock position for allowing said lid open-close mechanism to unlatch said lid of the cartridge chamber, wherein said lock member moves from said unlock position to said first lock position as said film transport mechanism starts winding the photo filmstrip, and moves from said first lock position to said second lock position as said film transport mechanism starts rewinding the photo filmstrip;
    further comprising a spring arranged so that the spring urges the lock member toward the unlock position from either of the first lock position and the second lock position.

2. A camera as recited in claim 1, wherein said unlock position of said lock member is located between said first lock position and said second lock position.

3. A camera as recited in claim 2, wherein said safety-lock mechanism further comprises a transmission device for transmitting a rotational movement of said feed motor to said lock member, to drive said lock member to move between said first and second lock positions and said unlock position, wherein said lock member is moved from said second lock position to said unlock position by rotating said feed motor in an opposite direction to a direction of rewinding said photo filmstrip after said photo filmstrip is completely rewound into said cartridge shell.

4. A camera as recited in claim 3, wherein said lock member is rotatably mounted on a pivot axle, and said transmission device comprises a transmission gear and a lever member which are rotatably mounted on said pivot axle, said transmission gear transmitting a rotational power of said feed motor to said lever member and causing said lever member to push said lock member from said unlock position to said first lock position or said second lock position.

5. A camera as recited in claim 4, wherein said transmission gear and said lever member are coupled to each other by friction, and the friction between said transmission gear and said lever member has a strength enough to hold said lock member at said first lock position or said second lock position against the urging force of said spring even after said transmission gear stops rotating as said feed motor stops, so said lock member starts rotating from said first lock position or said second lock position to said unlock position when the lock member receives the rotational movement from said feed motor in the same direction as the urging direction of said spring.

6. A camera as recited in claim 5, wherein said transmission gear is used for transmitting the rotational movement of said feed motor to a drive gear for driving a spool of said cartridge shell, and is coupled to said drive gear through a delayed-transmission device such that the rotational movement of said feed motor is not transmitted to said drive gear before said lock member reaches said unlock position.

7. A camera as recited in claim 6, wherein said drive gear is rotatably mounted on said pivot axle above said transmission gear, and is held at a stepped portion formed on a peripheral surface of said pivot axle to avoid contact with said transmission gear except through said delayed-transmission device.

8. A camera as recited in claim 7, wherein said drive gear is pressed onto said stepped portion by a spring, so said drive gear is held in its stop position so long as the rotational movement of said feed motor is not transmitted to said drive gear.

9. A camera as recited in claim 1, wherein said photo film cartridge is of IX240 type that has a light-blocking door member inside a film port of said cartridge shell, and said camera further comprises a device for interconnecting said door member with said lid open-close mechanism such that said door member is moved to a closed position to close said film port as said lid open-close mechanism moves to said unlatching position, or to an open position to open said film port as said lid open-close mechanism moves to said latching position.

* * * * *